US011095176B2

(12) United States Patent
Röer

(10) Patent No.: US 11,095,176 B2
(45) Date of Patent: Aug. 17, 2021

(54) ALUMINUM FORM-WOUND COIL AND WINDING STRUCTURE, AND STATOR FOR A GENERATOR OF A WIND TURBINE, AND METHOD FOR PRODUCING A STATOR

(71) Applicant: Wobben Properties GmbH, Aurich (DE)

(72) Inventor: Jochen Röer, Ganderkesee (DE)

(73) Assignee: Wobben Properties GmbH, Aurich (DE)

( * ) Notice: Subject to any disclaimer, the term of this patent is extended or adjusted under 35 U.S.C. 154(b) by 155 days.

(21) Appl. No.: 16/096,242

(22) PCT Filed: Apr. 24, 2017

(86) PCT No.: PCT/EP2017/059664
§ 371 (c)(1),
(2) Date: Oct. 24, 2018

(87) PCT Pub. No.: WO2017/186644
PCT Pub. Date: Nov. 2, 2017

(65) Prior Publication Data
US 2019/0140505 A1 May 9, 2019

(30) Foreign Application Priority Data
Apr. 28, 2016 (DE) ...................... 10 2016 107 929.4

(51) Int. Cl.
*H02K 3/28* (2006.01)
*H02K 3/02* (2006.01)
(Continued)

(52) U.S. Cl.
CPC ................. *H02K 3/02* (2013.01); *F03D 9/25* (2016.05); *H02K 1/16* (2013.01); *H02K 3/12* (2013.01);
(Continued)

(58) Field of Classification Search
CPC ............ H02K 3/28; H02K 3/50; H02K 3/505; H02K 15/0081
See application file for complete search history.

(56) References Cited

U.S. PATENT DOCUMENTS 6,252,327 B1   6/2001  Matsuzaki
8,093,778 B2   1/2012  Schmid et al.
(Continued)

FOREIGN PATENT DOCUMENTS

DE   60007474 TT2     7/2004
DE   102009008405 A1  8/2010
(Continued)

*Primary Examiner* — Ramon M Barrera
(74) *Attorney, Agent, or Firm* — Seed Intellectual Property Law Group LLP

(57) ABSTRACT

A form-wound coil for a stator of a generator of a gearless wind power installation. The form-wound coil comprises an electrical conductor, wherein the electrical conductor has a plurality of turns and also a first end and a second end. The first end has a first connecting part for connection to a connecting element and the second end has a second connecting part for connection to a further connecting element and the electrical conductor comprises aluminum or is substantially composed of aluminum. A connecting element for connecting a connecting part of a form-wound coil to a connecting part of a further form-wound coil. A winding structure for a stator and also to a stator and to a method for producing a stator.

20 Claims, 5 Drawing Sheets

(51) Int. Cl.
  *H02K 3/12* (2006.01)
  *H02K 3/50* (2006.01)
  *H02K 7/18* (2006.01)
  *H02K 15/00* (2006.01)
  *F03D 9/25* (2016.01)
  *H02K 1/16* (2006.01)
  *H02K 3/34* (2006.01)
  *H02K 15/085* (2006.01)
  *H02K 3/38* (2006.01)

(52) U.S. Cl.
  CPC ............... *H02K 3/34* (2013.01); *H02K 3/50* (2013.01); *H02K 7/1838* (2013.01); *H02K 15/0081* (2013.01); *H02K 15/085* (2013.01); *F05B 2220/706* (2013.01); *H02K 3/38* (2013.01); *Y02E 10/72* (2013.01)

(56) References Cited

U.S. PATENT DOCUMENTS

| | | | |
|---|---|---|---|
| 9,653,977 | B2 | 5/2017 | Gudewer et al. |
| 2009/0200888 | A1 | 8/2009 | Tanaka et al. |
| 2010/0187939 | A1 | 7/2010 | Stiesdal |
| 2010/0194214 | A1 | 8/2010 | Takahashi et al. |
| 2012/0263602 | A1 | 10/2012 | Booth |
| 2013/0200743 | A1 | 8/2013 | Okimitsu |
| 2014/0070638 | A1 | 3/2014 | Brennvall |
| 2014/0265673 | A1 | 9/2014 | Kreidler et al. |
| 2015/0013149 | A1 | 1/2015 | Hashimoto et al. |
| 2015/0102605 | A1 | 4/2015 | Giengiel |
| 2016/0049841 | A1 | 2/2016 | Brennvall |
| 2017/0279324 | A1 | 9/2017 | Röer |

FOREIGN PATENT DOCUMENTS

| | | |
|---|---|---|
| DE | 102009008981 A1 | 8/2010 |
| DE | 102012208550 A1 | 11/2013 |
| EP | 1039616 A2 | 9/2000 |
| EP | 2621062 A1 | 7/2013 |
| GB | 2490901 A | 11/2012 |
| JP | S64-50638 U | 3/1989 |
| JP | 2000-270506 A | 9/2000 |
| JP | 2009-89456 A | 4/2009 |
| JP | 2009-219343 A | 9/2009 |
| JP | 2010-130709 A | 6/2010 |
| JP | 2012257366 A | 12/2012 |
| JP | 2013-162721 A | 8/2013 |
| JP | 2014-90567 A | 5/2014 |
| JP | 2015-523044 A | 8/2015 |
| KR | 20150014989 A | 2/2015 |
| RU | 2483413 C2 | 5/2013 |
| WO | 2005/004308 A1 | 1/2005 |
| WO | 2007/012207 A1 | 2/2007 |
| WO | 2014087389 A1 | 6/2014 |
| WO | 2016/023816 A1 | 2/2016 |

ALUMINUM FORM-WOUND COIL AND WINDING STRUCTURE, AND STATOR FOR A GENERATOR OF A WIND TURBINE, AND METHOD FOR PRODUCING A STATOR

BACKGROUND

Technical Field

The invention relates to a form-wound coil of a stator of a generator of a gearless wind power installation. The invention further relates to a winding structure of a stator of a generator of a wind power installation, and also to a stator. The invention also relates to a method for producing a stator.

Description of the Related Art

Stators of generators of gearless wind power installations are known which have a plurality of strands with in each case a plurality of windings. Said windings are produced with an insulated wire, for example composed of copper. For this purpose, the wire of a strand is wound into the slots of a stator main body of the stator, so that the strand is produced from one continuous piece of the wire. The stator main body is also called the stator ring. Said winding of the stator is highly cumbersome and has to be performed by hand in order, in particular at the bend points, to monitor the integrity of the wires and also the insulation of the wire as early as during the winding process.

Form-wound coils which correspond to a conductive material which is pre-formed in a plurality of turns and is prefabricated before insertion into the slots are further known. The known form-wound coils have connections which protrude far beyond the stator main body and by way of which the individual form-wound coils can be connected to one another by soldering or welding, so that the desired electrical interconnection of the entire winding structure is realized. The greatly protruding connections are necessary since, on account of the high development of heat during the soldering or welding, the connections have to be at a great distance from the slot, so that the form-wound coil does not become too hot in the region of the slot, this possibly leading to damage to the stator, specifically in particular to an insulation from the stator main body. Stators which are known in this way therefore have a particularly great axial depth in relation to wound stators, but this does not provide any further advantages during subsequent operation and hampers handling.

The German Patent and Trade Mark Office has, in the priority application relating to the present application, searched the following prior art: US 2013/0200743 A1, US 2014/0265673 A1, DE 600 07 474 T2, WO 2014/087389 A1, US 2014/0070638 A1, EP 2 621 062 A1 and US 2012/0263602 A1.

BRIEF SUMMARY

Provided is a solution which is less complicated than the method of winding the stator with continuous strands which, at the same time, does not require an excessively great axial depth of a stator, as is known in the prior art. The aim is at least to propose an alternative solution to solutions known to date.

Provided is a form-wound coil for a stator of a generator of a gearless wind power installation. The form-wound coil comprises an electrical conductor. The electrical conductor is wound into a plurality of turns and has a first end and also a second end. The first end has a first connecting part and the second end has a second connecting part. The first and the second connecting part are each designed in order to be connected to different connecting elements. The electrical conductor also comprises aluminum or is substantially composed of aluminum.

In this context, a form-wound coil is to be understood as a prefabricated, that is to say pre-wound, coil which has a predefined shape.

Owing to the invention, cumbersome winding of the stator with continuous strands is not necessary, but rather form-wound coils can be prefabricated. Here, an excessive depth in the axial direction can be avoided in spite of the form-wound coils since, according to the invention, the form-wound coils are formed from aluminum and therefore soldering or welding of the connecting parts of the form-wound coils to connecting elements can be performed at a substantially shorter distance from the stator main body since, on account of the lower heat which is required when soldering or welding aluminum, the risk of damage is reduced in comparison to known copper windings.

Therefore, a stator which has a substantially smaller axial depth and which can be produced by simply inserting the form-wound coils can be realized in this way.

The generator is preferably in the form of a ring generator. Accordingly, the magnetically active regions of the rotor and stator, specifically particularly the laminated cores of the stator and rotor, are arranged in an annular region around the air gap which separates the rotor and stator. In this case, the generator is free of magnetically active regions in an inner region with a radius of at least 50% of the mean air gap radius.

A ring generator can also be defined as being one in which the radial thickness of the magnetically active parts or, in other words, of the magnetically active region, specifically the radial thickness from the inner edge of the pole wheel to the outer edge of the stator, or from the inner edge of the stator to the outer edge of the rotor, in the case of an external-rotor machine, is smaller than the air gap radius, wherein in particular the radial thickness of the magnetically active region of the generator amounts to less than 30%, in particular less than 25%, of the air gap radius. In addition or as an alternative, a ring generator can be defined as being one in which the depth, specifically the axial extent of the generator, is smaller than the air gap radius, wherein the depth amounts to less than 30%, in particular less than 25%, of the air gap radius. In addition or as an alternative, a ring generator is of multi-pole configuration, and specifically has at least 48, 96, in particular at least 192, rotor poles.

According to a further embodiment, the connecting parts each correspond to a substantially straight section of the electrical conductor. At least one of the connecting parts is angled in relation to a coil longitudinal axis or a line parallel to the coil longitudinal axis. As an alternative or in addition, the other connecting part is oriented parallel to a coil longitudinal axis of the form-wound coil and is therefore not angled.

Accordingly, the two connections are arranged at a different angle to one another in relation to a coil longitudinal axis or to a line parallel to the coil longitudinal axis. According to a preferred embodiment, this angle lies in the range of from 45 to 90 degrees, particularly preferably in the range of from 60 to 80 degrees.

According to one embodiment, a form-wound coil has two substantially parallel elongate limbs, wherein each limb has a length of at least 80 cm, at least 100 cm or at least 120 cm. These limbs form the part of the form-wound coil which can later be completely inserted into the slots of a stator main body. The limbs are connected to one another on a first side of the form-wound coil, wherein the connecting parts are arranged on a second side. Two limbs of different form-wound coils are subsequently provided in each slot of a stator, so that the connecting parts of the form-wound coils, after being arranged in the slots in the stator main body, are situated very close together. Owing to the angling of at least one of the connecting parts in relation to the other connecting part however, an electrical connection of the connecting part to connecting elements is possible since these are easily accessible. At the same time, the risk of short-circuiting of two touching connections is counteracted.

According to a further embodiment, the conductor has a plurality of layers, in particular two layers. The layers are designed to be connected to one another by connecting the connecting parts to a connecting element at the same time. Here, according to a particularly preferred embodiment, the layers are each formed from a flat aluminum bar, an aluminum strip or a flat aluminum wire.

The flat aluminum bar, the aluminum strip or the flat aluminum wire particularly preferably has a height of 0.5 to 1.0 cm and a width of 1.0 to 3.0 cm.

Accordingly, for the purpose of producing a form-wound coil, layers which are formed from a flat aluminum bar, an aluminum strip or an flat aluminum wire, are preferably stacked one above the other by way of their broad side. After the stacking operation, the stacked layers are bent into the desired shape of the form-wound coil, so that a plurality of turns, for example two, three, four or five turns, are produced from the plurality of layers in each case.

By virtue of forming a plurality of layers, which are then also connected to one another by connecting the connecting part at the same time, it is possible to bend the form-wound coil, that is to say to change the electrical conductor to the desired shape, more easily. A desired large cross section of an electrical conductor in order to have desired electrical properties can therefore be achieved by the layer formation, without a one-piece electrical conductor which is difficult to bend having to be provided.

In summary, an electrical conductor with a single layer has to be comparatively twice as thick as a conductor with two layers in order to achieve the same electrical properties as the conductor with two layers. The use of a comparatively flat wire is therefore advantageous for producing the shapes of the form-wound coils in a plurality of layers than electrical conductors with a plurality of turns since said flat wire is comparatively easier to bend. A form-wound coil with a plurality of turns can therefore be produced in a particularly simple manner.

According to a further embodiment, the form-wound coil has a shape in the case of which an outer distance of the outer turn, that is to say preferably the outer side of the turn which is situated on the outside, from a geometric center of gravity is more than 40, 50 or 60 cm at least in a region of the outer winding. The geometric center of gravity is accordingly initially determined from the coil and a distance from this geometric center of gravity to the outer turn, that is to say in particular the side of said turn which is situated on the outside, is determined. In a region of the outer turn, said outer turn is at a distance from the geometric center of gravity, which can also be called the outer distance, which is therefore more than 40, 50 or 60 cm.

According to this embodiment, at least one of the ends of the electrical conductor is at a distance of less than 20 cm, or particularly preferably less than 10 cm or less than 5 cm, from at least one point in the region of the outer winding just mentioned above. The form-wound coil accordingly has ends, which protrude very slightly beyond the region of the turns, for connection to connecting elements, so that a very flat stator, that is to say a stator with a low depth, can be realized.

According to a further embodiment, the form-wound coil has one of at least three different shapes. In this case, the three different shapes are selected such that at least one of the ends of the electrical conductor of a form-wound coil according to the first shape is at a distance from a geometric center of gravity according to the first shape which differs from the distance of at least one of the ends of a form-wound coil according to the second shape from a geometric center of gravity of the form-wound coil according to the second shape.

That is to say, for example, the first end of a form-wound coil according to the first shape is at a distance from a geometric center of gravity according to the first shape which differs from the distance of the first end of a form-wound coil according to the second shape from a geometric center of gravity of the form-wound coil according to the second shape.

In addition or as an alternative, the second end of the electrical conductor of a form-wound coil according to the first shape is at a distance from a geometric center of gravity according to the first shape which differs from the distance of the second end of a form-wound coil according to the second shape from a geometric center of gravity of the form-wound coil according to the second shape.

According to the embodiment, the distance of at least one of the ends of a form-wound coil according to the third shape from a geometric center of gravity of a form-wound coil according to the third shape differs from the corresponding distances of the ends of the form-wound coils according to the first and the second shape. Accordingly, the distance of the first end of a form-wound coil according to the third shape from a geometric center of gravity of the form-wound coil according to the third shape differs from the distance of the first end of the form-wound coil according to the first shape from a geometric center of gravity of the form-wound coil according to the first shape and from the distance of the first end of the electrical conductor of a form-wound coil according to the second shape from a geometric center of gravity of the form-wound coil according to the second shape. This analogously applies to the second ends.

As a result, during the subsequent insertion of the form-wound coils into the slots of the stator main body, connection of the form-wound coil is possible in a simple manner since adjacent first ends and therefore first connecting parts and also second ends and therefore also the second connecting parts are at different heights and therefore are accessible in a simple manner for the purpose of establishing the electrical connections by means of connecting parts.

According to a further embodiment, the conductor or each layer of the conductor of the form-wound coil is insulated, wherein this insulation is preferably formed by means of a lacquer and/or powder coating. However, particularly preferably no insulation is applied or said insulation is removed in the region of the connecting parts. Therefore, insulation of the form-wound coil is possible even before production of the form-wound coil by simply applying the insulating layer, for example an insulating lacquer, onto the conductor in the unformed state, so that a reliable insulation can be produced in a simple manner.

Even if a slot insulation is provided in the slots of a stator main body before the insertion of the form-wound coils, the insulation of the electrical conductor of the form-wound coils serves as additional insulation from the stator main body which is preferably of laminated design and therefore likewise conductive. It is therefore also possible to dispense with complete enwinding of the form-wound coils for insulation purposes, which is also called insulation winding and is usually performed before the insertion of the form-wound coils into the slots. As a result, the dissipation of heat from the form-wound coil is improved since an insulating winding impedes the dissipation of heat during operation.

The disclosure also relates to a connecting element for connecting a connecting part of a form-wound coil according to one of the preceding embodiments to a connecting part of a further form-wound coil according to one of the preceding embodiments. The connecting element corresponds to a U-shaped aluminum sheet. The connecting element is preferably produced from an aluminum sheet with a thickness of at least 5 mm by stamping or by laser-cutting. The connecting element, at its ends of the U shape, further comprises in each case one aperture, which is preferably rectangular, for inserting a connecting part of one of the form-wound coils.

By virtue of the connecting element, the connecting parts of the form-wound coils can be connected in a simple manner. For this purpose, the connecting parts, which substantially correspond to the electrical conductor or a plurality of layers of the electrical conductor, are inserted through the apertures of the connecting elements and welded or soldered to the region around the aperture of the connecting element, wherein the TIG welding method is particularly advantageously suitable here.

Owing to the U shape of the connecting element, a plurality of connecting elements can be arranged in a particularly space-saving manner.

The disclosure further comprises a winding structure for a stator of a generator of a wind power installation. The winding structure comprises a plurality of form-wound coils according to one of the preceding embodiments and a plurality of connecting elements according to the abovementioned embodiment, in each case for electrically connecting two connection parts of two form-wound coils.

According to a further embodiment, a plurality of form-wound coils are connected in series, that is to say connected to one another, by the connecting elements, and therefore form a strand of the winding structure. Here, the form-wound coils are connected to one another in such a way that the winding structure has six strands which are arranged next to one another repeatedly in succession in the circumference of the stator, wherein in particular a first and a second strand are associated with a first phase, a third and a fourth strand are associated with a second phase, and a fifth and a sixth strand are associated with a third phase. Accordingly, six strands are therefore provided, which each correspond to form-wound coils which are connected in series by means of connecting elements.

According to a further embodiment, the winding structure is subdivided into a plurality of, in particular two, four, six or eight, sections or segments which are connected in parallel. Each segment preferably contains six phases, wherein identical phases of the segments are connected in parallel in the winding structure. As a result, there is a reduction in the maximum voltage induced in the strands, depending on the number of segments.

According to a further embodiment, the connecting elements and also the form-wound coils have a substantially identical coefficient of thermal expansion. This ensures that, in spite of the heat generated during operation of the winding structure, the connections during soldering or welding and after cooling do not tear open again on account of stresses.

According to a further embodiment, groups of twelve first connecting parts which are situated next to one another are connected to six connecting elements in such a way that five first connecting parts are situated between two connected first connecting parts. Three overlapping connecting elements which are situated next to one another are arranged at different distances or heights in relation to a center of the winding structure in the circumferential direction. Furthermore, a first, second and third connecting element, which are arranged next to one another in the circumferential direction, are arranged rotated through 180 degrees in relation to a fourth, fifth and sixth connecting element, which are arranged next to one another in the circumferential direction.

According to a further embodiment, the second connecting parts are also connected to one another in an analogous manner.

Provided is a stator of a generator of a wind power installation. The stator comprises a stator main body, which is also called a stator ring, and is preferably produced from laminated iron. The stator main body has respectively adjacent slots which are at a substantially identical distance from one another. The stator also comprises a plurality of form-wound coils according to one of the abovementioned embodiments, which form-wound coils are inserted into the slots. In addition, the stator comprises a plurality of connecting elements according to one of the abovementioned embodiments, to which connecting elements in each case two connecting parts of two form-wound coils are connected by welding or soldering. The stator is preferably constructed according to a winding structure of the abovementioned embodiment.

In addition, provided is a method for producing a stator, in particular a stator according to the abovementioned embodiment. According to the method, form-wound coils, in particular according to one of the abovementioned embodiments, are inserted into the slots of a stator main body and connecting parts of the form-wound coils are each inserted into an aperture of a connecting element. Here, the form-wound coils and also the connecting elements are formed with aluminum or are substantially composed of aluminum.

The connecting part is preferably heated in the region of the aperture for connection purposes in such a way that the aluminum liquefies and after cooling down produces a connection of the connecting element to the connecting part.

According to one embodiment, adjacent form-wound coils are inserted into the slots of the stator main body in succession, wherein a predetermined number of the form-wound coils to be inserted first are only partially inserted into the slots or even positioned only in the region in front of the slots and this predetermined number is only fully inserted into the corresponding slots together with a predetermined number of form-wound coils to be inserted last.

As has already been explained above, the limbs of two different form-wound coils are inserted into one slot. As a result, as viewed in the circumferential direction of the stator, there are inserted between the two limbs of one and the same form-wound coil the limbs of a plurality of other form-wound coils. Accordingly, the form-wound coils therefore overlap in the state in which they have been inserted into the stator.

As a result of this overlap, it is normally the case that a form-wound coil which has been inserted into the stator slot first is partially bent out of the slot again for the insertion of the form-wound coil which is to be inserted last. Owing to the production method according to the invention, this bending-out operation is now no longer necessary, so that there is no damage to the insulation of the form-wound coils or bending of the form-wound coils out of shape.

According to a further embodiment of the method, the completed stator is fully immersed into a resin bath or liquid resin and is removed from the resin again in order to allow the resin adhering to the stator to cure. In this way, an insulation of all conductive parts which are not already insulated is realized. Therefore, the stability of the entire structure is also increased.

BRIEF DESCRIPTION OF THE SEVERAL VIEWS OF THE DRAWINGS

Further embodiments of the invention will emerge from the exemplary embodiments explained in more detail on the basis of the drawings. In the drawing.

DETAILED DESCRIPTION

Figure 1:
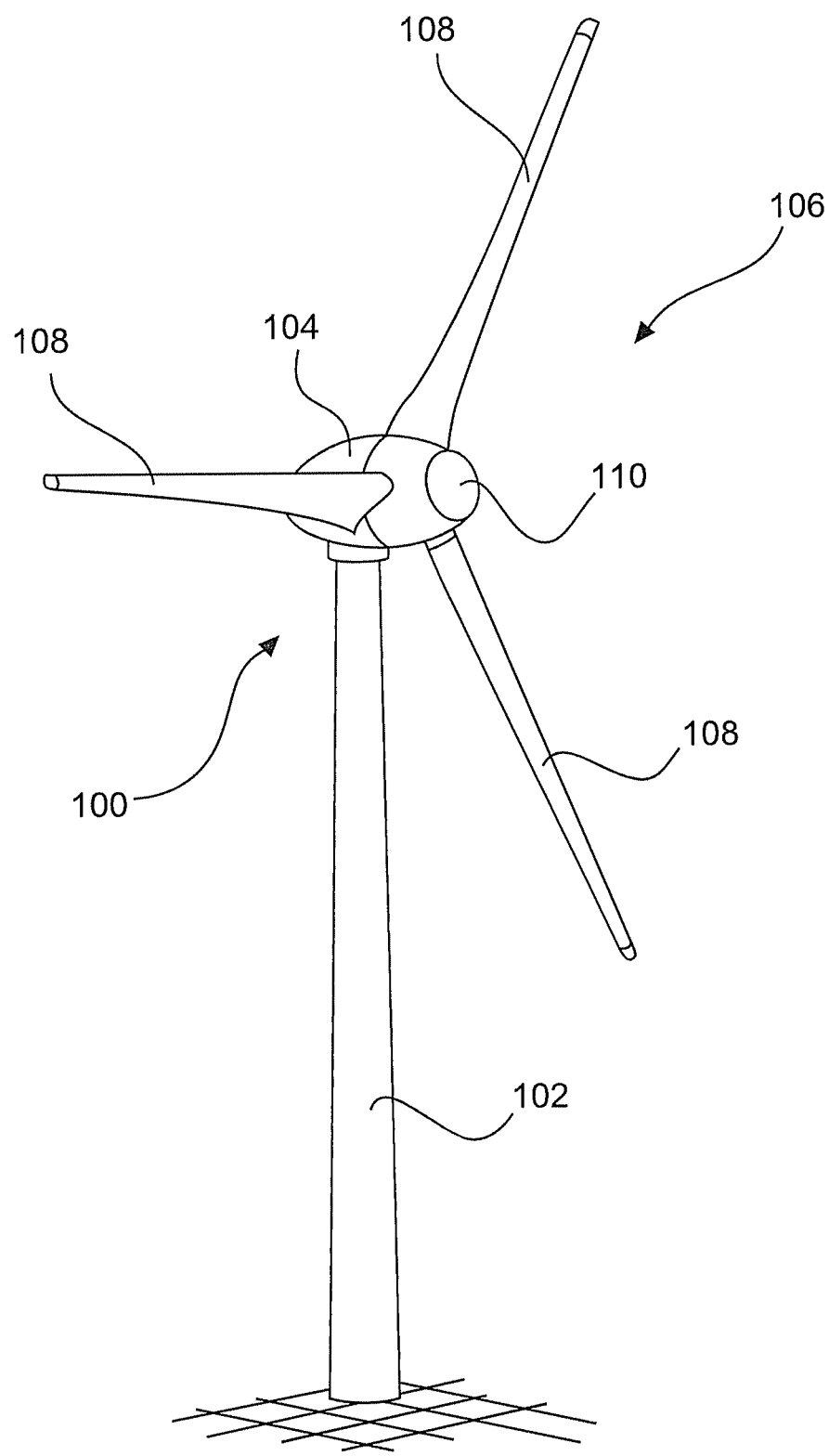
FIG. 1 shows a wind power installation.

FIG. 1 is a schematic illustration of a wind power installation according to the invention. The wind power installation 100 has a tower 102 and a nacelle 104 on the tower 102. An aerodynamic rotor 106 with three rotor blades 108 and a spinner 110 is provided on the nacelle 104. During the operation of the wind power installation, the aerodynamic rotor 106 is set in a rotational movement by the wind and therefore also turns a rotor of a generator which is coupled directly or indirectly to the aerodynamic rotor 106. The electrical generator is arranged in the nacelle 104 and generates electrical energy. The pitch angles of the rotor blades 108 can be varied by pitch motors at the rotor blade roots 108b of the respective rotor blades 108.

Figure 2:
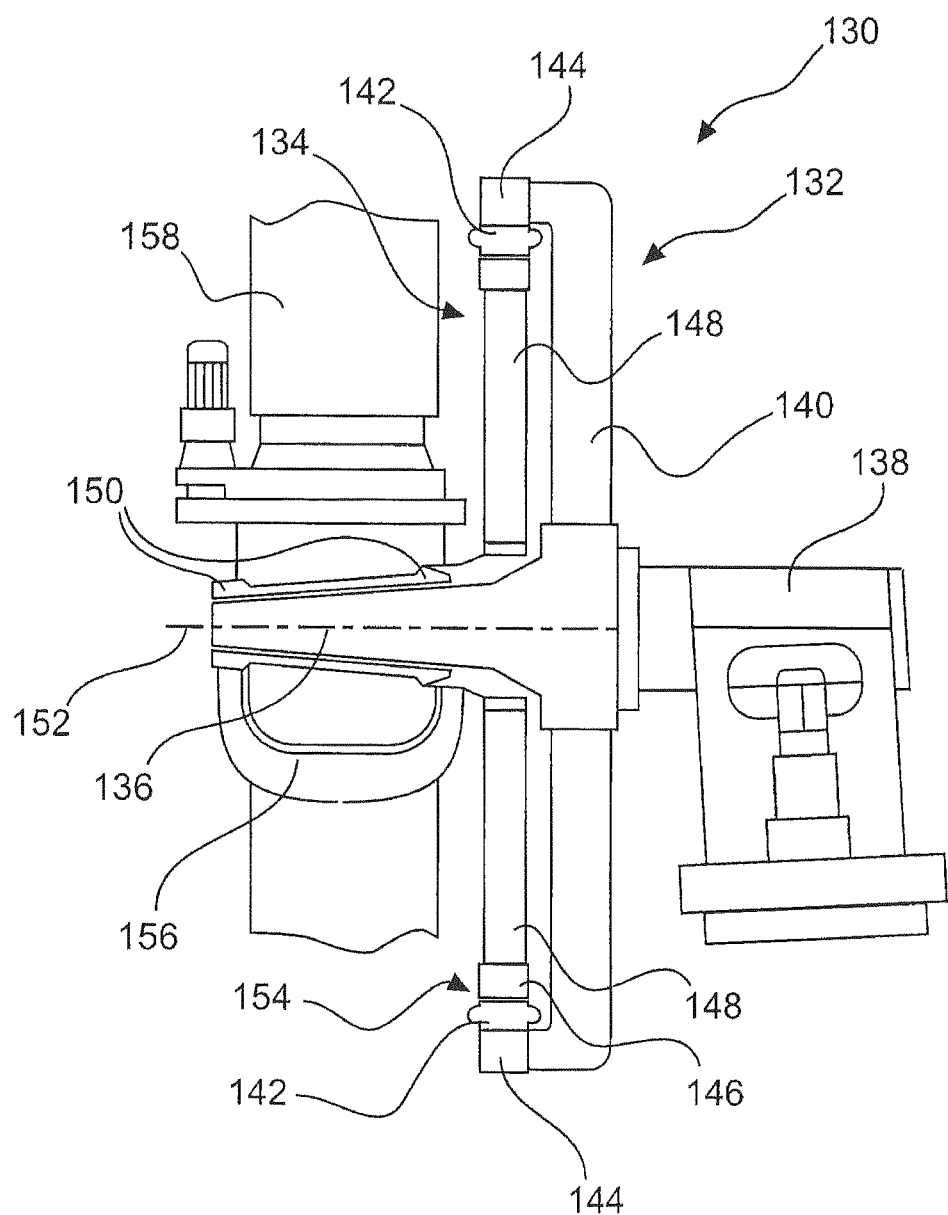
FIG. 2 shows a schematic side view of a generator.

FIG. 2 shows a schematic side view of a generator 130. Said generator has a stator 132 and an electrodynamic rotor 134 mounted such that it can rotate relative to said stator, and is fastened by way of its stator 132 to a machine support 138 by means of a journal 136. The stator 132 has a stator support 140 and stator laminated cores 142 which form stator poles of the generator 130 and which are fastened by means of a stator ring 144 to the stator support 140.

The electrodynamic rotor 134 has rotor pole shoes 146 which form rotor poles and, by means of a rotor support 148 and bearing 150, are mounted on the journal 136 such that they can rotate about the rotation axis 152. The stator laminated cores 142 and rotor pole shoes 146 are separated by only a narrow air gap 154, which is a few millimeters thick, in particular less than 6 mm, but has a diameter of several meters, in particular more than 4 m.

The stator laminated cores 142 and the rotor pole shoes 146 form in each case one ring and, together, are also annular, so that the generator 130 is a ring generator. The electrodynamic rotor 134 of the generator 130 intentionally rotates together with the rotor hub 156 of the aerodynamic rotor, roots of rotor blades 158 of said aerodynamic rotor being indicated.

Figure 3:
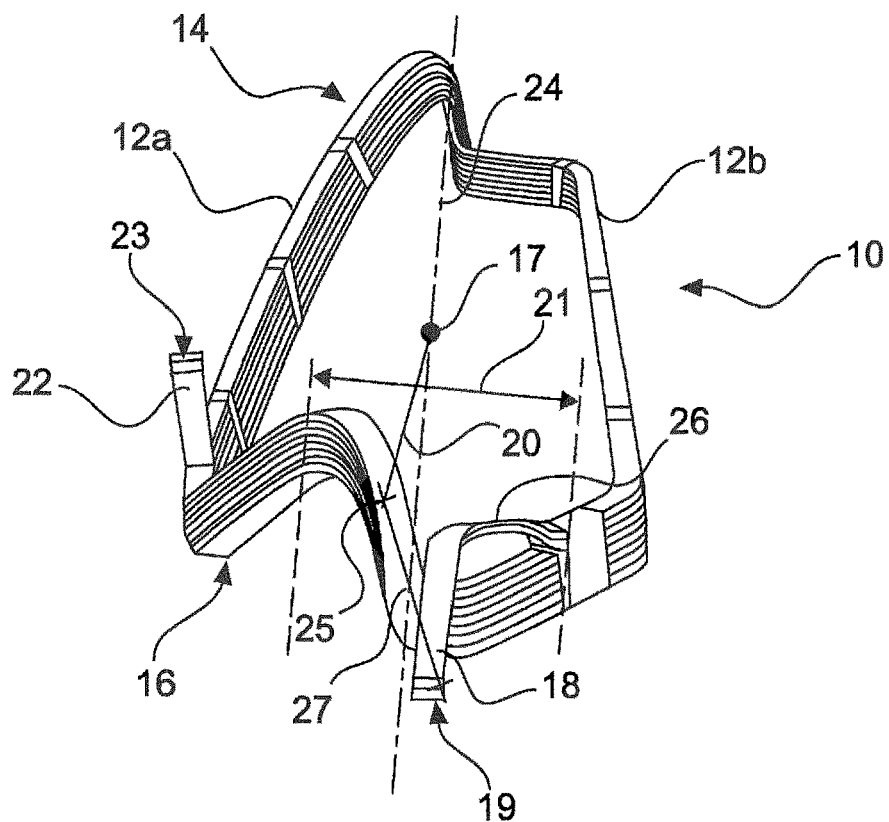
FIG. 3 shows a view of a form-wound coil.

FIG. 3 shows a view of an exemplary embodiment of a form-wound coil 10. The form-wound coil 10 has two limbs 12a, 12b. The limbs 12a, 12b run substantially parallel to one another and have a length of greater than 80 cm. The two limbs 12a, 12b are connected to one another on a first side 14 and also on a second side 16. The limbs 12a, 12b and also the first side 14 and the second side 16 form a shape which has a geometric center of gravity 17.

The second side 16 of the form-wound coil 10 has a first connecting part 18 at a first end 19 and also a second connecting part 22 at a second end 23. The second connecting part 22 is angled in relation to a coil longitudinal axis 24 or a line parallel to the coil longitudinal axis 24, and the first connecting part 18 is not angled.

The form-wound coil 10 comprises a conductor 26 and the connecting parts 18 and 22 which are manufactured with aluminum. The conductor 26 is composed of two layers of a flat wire which are formed into four turns. The two connecting parts 18, 22 subsequently serve for connecting the two layers of the flat wire, which is also called the flat aluminum wire.

The form-wound coil 10 is therefore formed with said two layers and four windings, so that eight layers of the flat copper wire are arranged or stacked one above the other in the region of the limbs 12a, 12b and in the region of the first side 14.

In addition, the shape is selected such that an outer distance 20 at least in a region 21 of the outer turn from a geometric center of gravity 17 amounts to more than 50 cm. In addition, the distance 27 to the end 19 from a point 25 in this region 21 amounts to less than 10 cm.

Owing to the routed-out connecting parts 18, 20, six layers remain arranged one above the other in the region of the second side 16. The flat aluminum wire is insulated by lacquering. However, the insulation has been removed in the region of the connecting parts 18, 22 of the conductor 26 in order to be able to subsequently connect the connecting parts 18, 22 to one another by welding or soldering, without leaving behind residues of the insulation in the connecting region.

Figure 4:
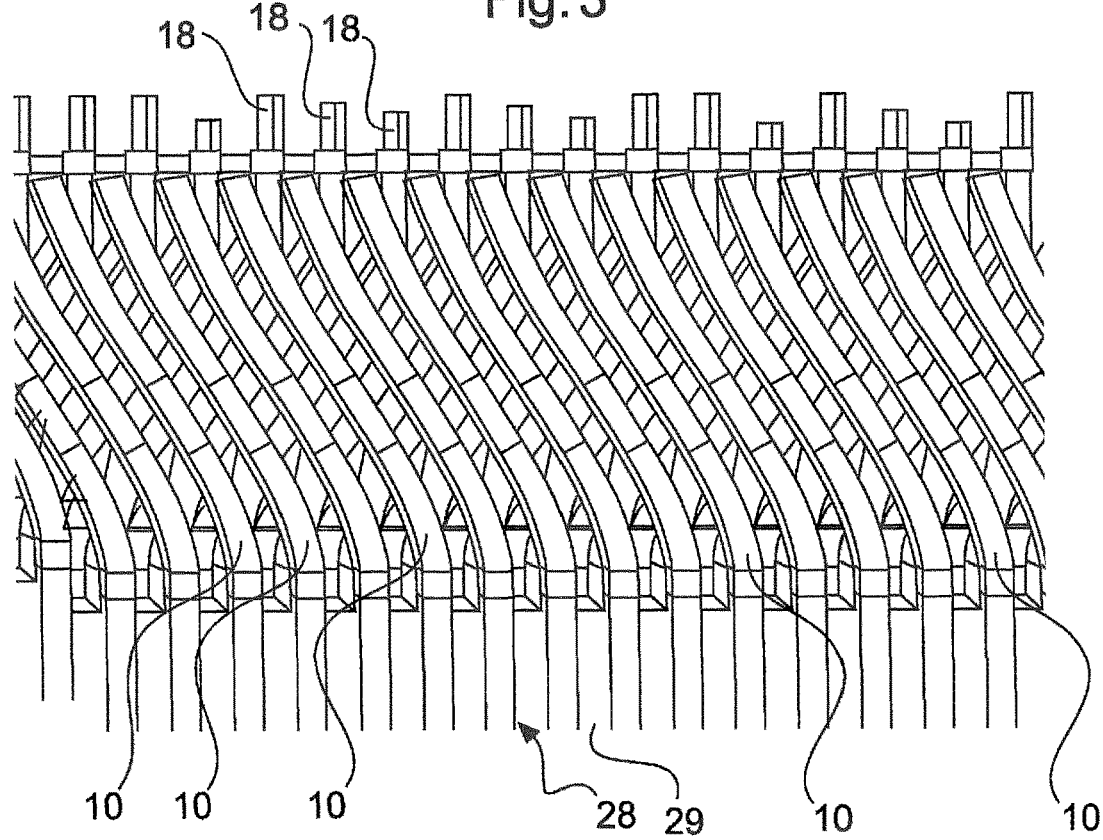
FIG. 4 shows a view of the stator from the center.

FIG. 4 shows a side view of the form-wound coils 10 from the center of a stator 132, which form-wound coils are each already inserted into slots 28 of a stator main body 29. It can further be seen that the first connecting parts 18, which can be seen in this view, are arranged at different levels.

Figure 5:
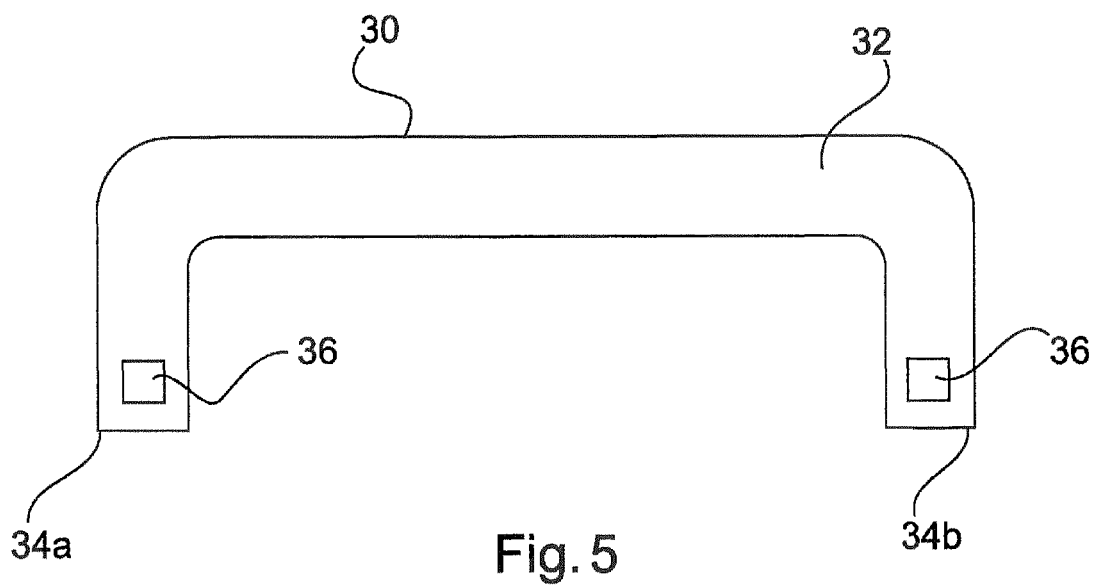
FIG. 5 shows a connecting element.

The connections of the form-wound coils 10 are established by connecting elements 30. A connecting element 30 of this kind is illustrated in FIG. 5. The connecting elements 30 can also be called connecting lugs. The connecting elements 30 each comprise a flat bar 32 which has in each case one aperture 36 at its ends 34a, 34b. The flat bar 32 has a U shape, so that every sixth first connecting part 18 and every sixth second connecting part 22 are connected to one another by a connecting element 30 of said kind, without the connecting element 30 being in contact with other connecting parts 18, 22 which are not intended to be connected to one another. Therefore, the connecting elements 30 are not insulated.

The connecting elements 30 which are connected to the second connecting parts 22 have apertures 36 which are spaced further apart from one another than the apertures 36 of the connecting elements 30 connected to the first connecting part 18. This is because, proceeding from a center of the stator 132, the second connecting parts 20 lie on a greater radius than the first connecting parts 18.

Figure 6:
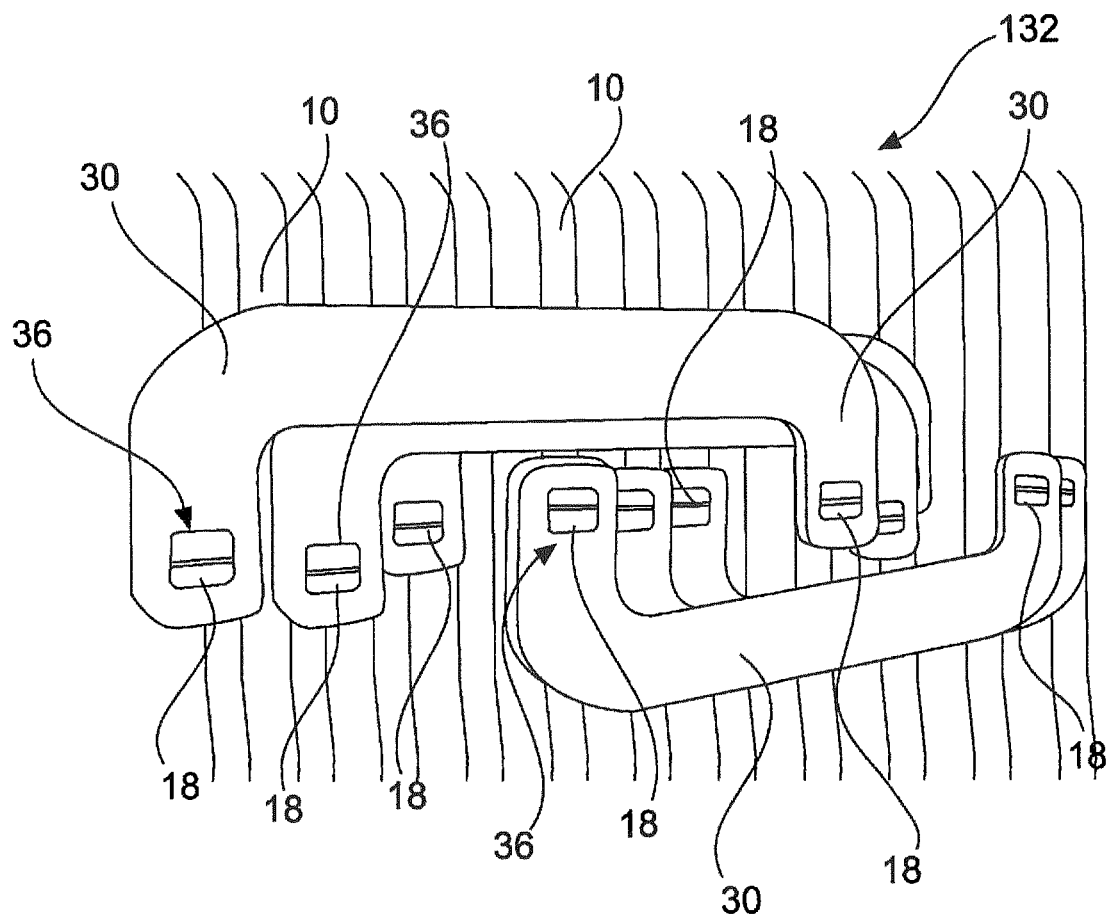
FIG. 6 shows an exemplary detail of the structure of a stator.

FIG. 6 shows an exemplary detail of the structure of a stator 132, form-wound coils 10 being inserted into the slots 28 of said stator. The form-wound coils 10 can be connected to one another, initially only releasably, by means of connecting elements 30. To this end, the first connecting parts 18 of the form-wound coils 10 are routed through the apertures 36 of the connecting elements 30.

It can further be seen that adjacent form-wound coils 10 have first connecting parts 18 which protrude by different lengths. This results in a sawtooth-like profile of the heights of the connecting parts 18.

Figure 7:
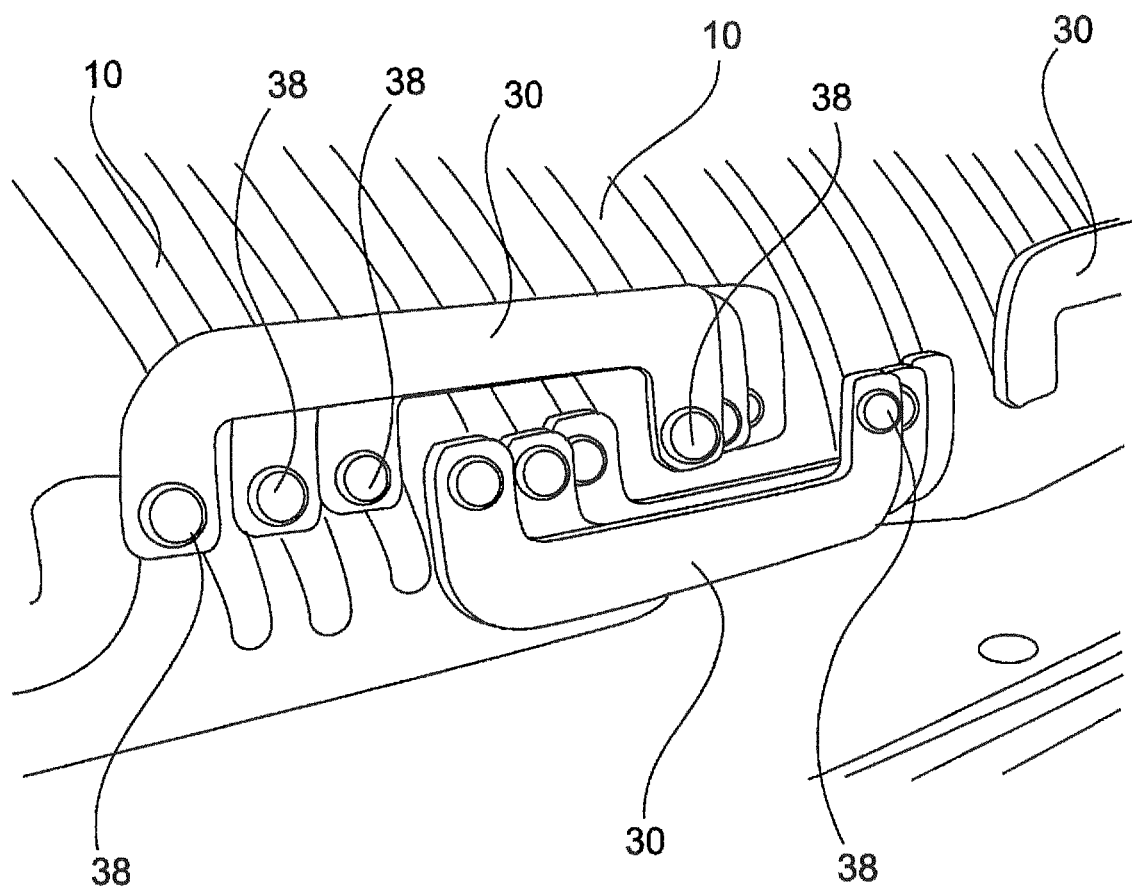
FIG. 7 shows a further exemplary detail of the structure of a stator.

FIG. 7 is substantially the same illustration as FIG. 6. However, the connecting elements 30 are now connected to the connecting parts 18 by welding here. The weld points 38 can still be clearly seen.

The invention claimed is:

1. A form-wound coil for a stator of a generator of a gearless wind power installation, the form-wound coil comprising:
    an electrical conductor, wherein the electrical conductor has a plurality of turns, a first end, and a second end, wherein a first connecting part for connection to a first connecting element is arranged at the first end, and a second connecting part for connection to a second connecting element is arranged at the second end, wherein the electrical conductor comprises aluminum or is substantially composed of aluminum, and wherein the electrical conductor comprises a plurality of layers, wherein respective ones of the plurality of layers are connected to one another by connecting the first and second connecting parts to the first and second connecting elements, respectively.

2. The form-wound coil as claimed in claim 1, wherein the generator is a ring generator.

3. The form-wound coil as claimed in claim 1, wherein the first and second connecting parts, each correspond to a substantially straight section of the electrical conductor, wherein at least one of the first and second connecting parts of the form-wound coil is angled in relation to a coil longitudinal axis, wherein the other of the first and second connecting parts is oriented parallel to the coil longitudinal axis.

4. The form-wound coil as claimed in claim 1, wherein the form-wound coil has at least one shape in which an outer distance of an outer turn from a geometric center of gravity is more than 40 cm at least in a region of an outer winding and at least one of the ends of the electrical conductor is less than 20 cm away from at least one point in the region.

5. The form-wound coil as claimed in claim 1, wherein the plurality of layers are each a flat aluminum bar, an aluminum strip, or a flat aluminum wire.

6. The form-wound coil as claimed in claim 1, wherein the form-wound coil has a shape that is one of first, second, or third different shapes, wherein at least one of the ends of the electrical conductor of the form-wound coil according to the first shape is at a first distance from a geometric center of gravity, which differs from a second distance of at least one of the ends of the form-wound coil according to the second shape from the geometric center of gravity of the form-wound coil, and wherein a third distance of at least one of the ends of the form-wound coil according to the third shape from the geometric center of gravity of the form-wound coil differs from the corresponding distances of the ends of the form-wound coil according to the first and the second shapes.

7. The form-wound coil as claimed in claim 1, wherein the electrical conductor or each layer of the electrical conductor of the form-wound coil has an insulation.

8. A connecting element for connecting one of the first or second connecting parts of the form-wound coil as claimed in claim 1 to another connecting part of another form-wound coil, wherein the connecting element is a U-shaped aluminum sheet with a thickness of at least 5 mm having first and second ends, wherein the first and second ends of the connecting element have first and second apertures, respectively, for inserting the another connecting part of the another form-wound coil.

9. A winding structure for a stator of a generator of a wind power installation, comprising:
    a plurality of form-wound coils as claimed in claim 1, and
    a plurality of connecting elements, each of the plurality of connecting elements being for electrically connecting two connecting parts of two form-wound coils.

10. The winding structure as claimed in claim 9, wherein the plurality of form-wound coils are connected to one another in such a way that the winding structure has six strands arranged next to one another in succession in a circumference of the stator.

11. The winding structure as claimed in claim 9, wherein the winding structure is divided into a plurality of segments, and wherein identical strands and/or phases of the plurality of segments are connected in parallel with one another.

12. The winding structure as claimed in claim 9, wherein the plurality of connecting elements and the plurality of form-wound coils have a substantially identical coefficient of thermal expansion.

13. The winding structure as claimed in claim 9, wherein groups of twelve first connecting parts that are situated next to one another are connected to six connecting elements in such a way that five first connecting parts are situated between two connected first connecting parts, and three overlapping connecting elements that are situated next to one another are arranged at different distances or heights in relation to a center of the winding structure in the circumferential direction, and
    wherein a first, a second, and a third connecting element, which are arranged next to one another in the circumferential direction, are arranged rotated through 180 degrees in relation to a fourth, fifth and sixth connecting element, which are arranged next to one another in the circumferential direction.

14. A stator of a generator of a wind power installation, comprising:
    a stator main body having a plurality of circumferential slots, wherein respectively adjacent slots are at a substantially identical distance from one another,
    a plurality of form-wound coils as claimed in claim 1 are inserted into the slots, and
    a plurality of connecting elements to which in each case two connecting parts of two form-wound coils are fixedly connected.

15. A method for producing a stator comprising:
    inserting a plurality of form-wound coils as claimed in claim 1 into slots of a stator main body,
    inserting connecting parts of form-wound coils apertures of connecting elements, respectively, and
    heating the connecting parts in regions of the apertures to couple the connecting elements to the connecting parts, respectively.

16. The method as claimed in claim 15, wherein the plurality of form-wound coils which are adjacent in succession are inserted into the slots of the stator main body, wherein a predetermined number of first form-wound coils to be inserted are only partially inserted into the slots or positioned in front of the slots and only fully inserted into corresponding slots together with a predetermined number of form-wound coils to be inserted last.

17. The form-wound coil as claimed in claim 2, wherein the ring generator has an air gap diameter of at least 4 meters.

18. The form-wound coil as claimed in claim 7, wherein the insulation is lacquer or a powder coating, wherein the first and second connecting parts do not have insulation.

19. The winding structure as claimed in claim 10, wherein a first and a second strand of the six strands are associated with a first phase, wherein a third and a fourth strand are associated with a second phase, and wherein a fifth and a sixth strand are associated with a third phase.

20. The winding structure as claimed in claim 11, wherein the winding structure is divided into two, four, six or eight segments.

* * * * *